United States Patent
Schunk

(10) Patent No.: US 6,591,023 B1
(45) Date of Patent: Jul. 8, 2003

(54) OPTICAL TRANSMITTER HAVING A MODULATION-CAPABLE WAVELENGTH-STABLE LASER SOURCE

(75) Inventor: Nikolaus Schunk, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,974

(22) PCT Filed: Jul. 14, 1998

(86) PCT No.: PCT/DE98/01965

§ 371 (c)(1),
(2), (4) Date: Apr. 5, 2000

(87) PCT Pub. No.: WO99/20003

PCT Pub. Date: Apr. 22, 1999

(30) Foreign Application Priority Data

Oct. 15, 1997 (DE) .......................................... 197 45 466

(51) Int. Cl.[7] ............................. G02F 1/01; H04B 10/04
(52) U.S. Cl. ................................ 385/1; 385/14; 385/88; 385/92; 385/129; 385/130; 359/180; 359/181; 359/188
(58) Field of Search .................. 385/1, 2, 3, 14, 385/31, 38, 88, 92; 359/180, 181, 188

(56) References Cited

U.S. PATENT DOCUMENTS

| 6,222,958 | B1 | * | 4/2001 | Paiam | 385/24 |
|---|---|---|---|---|---|
| 6,275,322 | B1 | * | 8/2001 | Tai | 359/279 |
| 6,281,977 | B1 | * | 8/2001 | Paiam et al. | 356/480 |
| 6,396,609 | B1 | * | 5/2002 | Cheng et al. | 359/161 |
| 6,426,816 | B1 | * | 7/2002 | Wu et al. | 359/122 |

FOREIGN PATENT DOCUMENTS

| DE | 197 05 669 | 8/1988 | 385/37 X |
|---|---|---|---|
| EP | 0 580 990 | 2/1994 | 385/42 X |
| EP | 0 584 647 | 3/1994 | 385/1 X |
| GB | 2 308 461 | 6/1997 | 385/37 X |

OTHER PUBLICATIONS

Patent Abstracts of Japan, vol. 012, No. 225 (E–626), Jun. 25, 1988 & JP 63 017572 A (Japan Aviation Electronics Ind. Ltd.), Jan. 25, 1988.

T. Tanaka et al., "Integrated External Cavity Laser Composed of Spot–Size Converted LD and UV Written Grating in Silica Waveguide on Si.", Electronics Letters, vol. 32, No. 13, Jun. 20, 1996.

* cited by examiner

*Primary Examiner*—Brian Healy
(74) *Attorney, Agent, or Firm*—Kenyon & Kenyon

(57) ABSTRACT

An optical transmitter having a modulation-capable wavelength-stable laser source is proposed, the signal of the laser source passing through at least one Michelson bandpass filter to prevent interference signals of other wavelengths outside the emitted wavelength from affecting the laser.

8 Claims, 2 Drawing Sheets

1

OPTICAL TRANSMITTER HAVING A MODULATION-CAPABLE WAVELENGTH-STABLE LASER SOURCE

FIELD OF THE INVENTION

The present invention concerns an optical transmitter having a modulation-capable wavelength-stable laser source. Patent 2 308 461.

BACKGROUND INFORMATION

European Patent 0 584 647 describes an optical transmitter which is used in optical telecommunications. The transmitter is composed of a laser source, whose signal is modulated into the transmission link before the coupling. A transmitter of this type is used in broadband communications to transmit data over great distances. The transmission system, in this context, operates on a given wavelength. The transmitter is unprotected against interference that arises from light of other wavelengths and that can lead to the output signal being subjected to distortion and noise.

SUMMARY

The optical transmitter according to the present invention has the advantage that only the optical output at the transmission wavelength is coupled by reflection into the transmission link via a Michelson interferometer, in a wavelength-selective manner. Wavelengths outside of the bandwidth of the Michelson interferometer pass through it and can be absorbed (drained off). The band-pass filter prevents signals of wavelengths other than the wavelength of the transmitter from arriving over the coupled fiber-optic lines into the transmitter. In this manner, the laser source remains free of interference and harmonics of different wavelengths, which leads to very stable wavelength selection. In this manner, it is possible to use the transmitter according to the invention in a system that employs a wavelength multiplex as its transmission method. For use in a wavelength multiplex transmission system, it is not necessary to take any further.

As a result of the measures indicated in the subclaims, an advantageous refinement and improvement of the optical transmitter described in the main claim is possible.

It is particularly advantageous if the laser source is composed of a semiconductor laser, whose field distribution at the front end is broadened into a coupled strip waveguide. Due to the beam expansion, the semiconductor laser can be coupled to the strip waveguide passively and therefore in a simple manner. To adjust the wavelength, an antireflective layer is applied to the end surface, which is coupled to the strip waveguide, the antireflective layer eliminating the laser resonator of the semiconductor chip. The coupled strip waveguide is composed of a silica-glass-core step-index structure, the waveguide core being made of glass doped using germanium. A Bragg grating can be written into the waveguide core using UV light. The wavelength-selective Bragg grating and the other semiconductor laser end surface, facing away, form the laser resonator. As a function of the wavelength selection of the Bragg grating, the laser oscillates on the wavelength of the Bragg grating. The data signal of the optical output can be modulated via the internal current modulation of the laser diode. It is advantageous if both the strip waveguide of the laser diode as well as the glass strip waveguide are executed so as to be diagonal with respect to the antireflective layer. In this manner, residual reflections at a non-ideal antireflective layer are suppressed both in the direction of the semiconductor laser as well as of the Bragg grating. The specific reflected output is not coupled into the respective strip waveguide on account of the canted end surface. In the emission spectrum, no additional mode structure that could lead to mode jumps are formed in the antireflective layer as a result of the suppression of the reflection.

Advantageously, another version of a wavelength selective transmission source can also be used. The highly stable wavelength selective source is designed as an erbium/ytterbium-doped glass waveguide DFB laser. A semiconductor laser is used as the pump source. The optical output power can be adjusted via the magnitude of the pumping power. The modulation takes place externally, which has the advantage that higher modulation rates are possible, extending into the gigabyte range.

Advantageously, all transmitters coupled to the transmission optical fiber by reflection have a wave absorber for those wavelengths that are not emitted by the laser diode. This wave absorber can be composed of bevelings or a raw edge of the planner glass strip waveguides ends that are not coupled into the laser diode and the transmission optical fiber.

DETAILED DESCRIPTION

Figure 1:
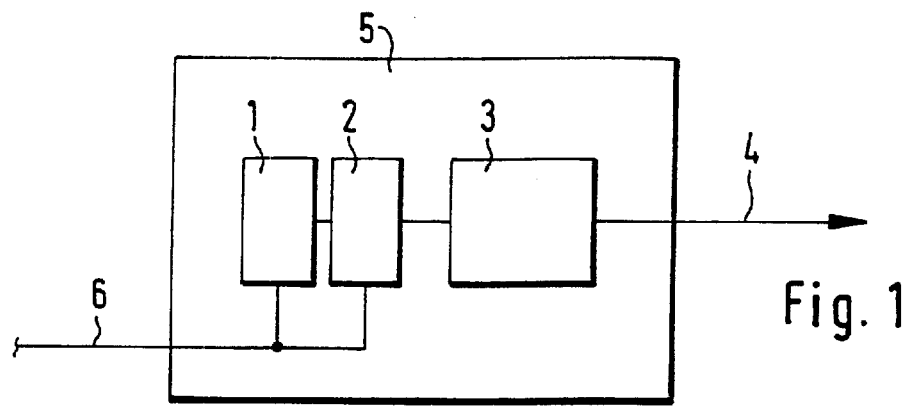
FIG. 1 shows a block diagram of an example optical transmitter according to the present invention.

FIG. 1 depicts the schematic design of the optical transmitter. Laser source 1 is connected to a modulator 2, which in turn is connected to a reflector 3. Via reflector 3, laser signal 4 arrives at the decoupling optical fiber. Optical transmitter 5 has an electrical connection terminal 6. Via electrical connection terminal 6, both laser source 1 as well as modulator 2 are supplied with power. The separation between the laser source in the modulator is not mandatory, since an internal modulation, e.g., of a semiconductor laser, is also possible.

Figure 2:
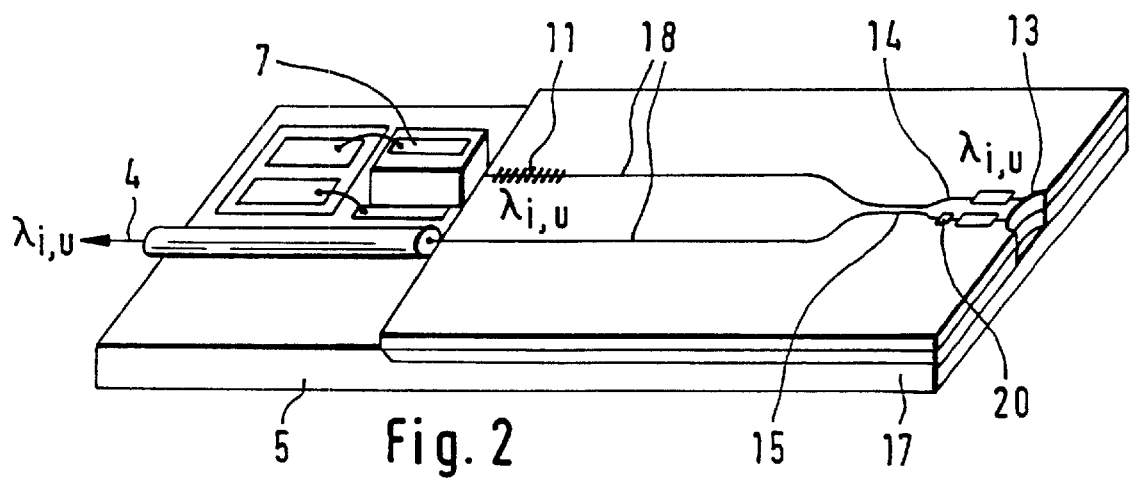
FIG. 2 shows an exemplary embodiment of an optical transmitter according to the present invention.

FIG. 2 depicts an optical transmitter 5 according to the invention, that is mounted on a silicon chip 17. On silicon chip 17, a semiconductor laser 7 and an optical planar circuit arrangement having strip waveguides 18 are executed in glass. Semiconductor laser 17 is coupled to strip waveguide 18. A UV-induced Bragg grating 11 is written into the wavelength core of the strip waveguide, Bragg grating 11 determining the emission wavelength of the semiconductor laser. A Michelson interferometer is connected downstream of this transmission source, the Michelson interferometer operating as a reflective optical band-pass filter. It is composed of 3 dB coupler 15 and two UV-induced gratings 14 in the waveguide arms. The UV-induced gratings reflect the transmission output at the transmission wavelength. Via a UV-induced refractive index modification 20, the reflective band-pass filter is trimmed at the maximum. The planar strip waveguide is connected at the output side to a glass optical fiber 4, which conveys the signal to be decoupled. The open waveguide arms of the band-pass filter terminate in a beveled (slanted) edge 13 of the planar optical circuit. Wavelengths outside of the transmission wavelength are deflected from the diagonal edge and thus absorbed.

A semiconductor laser 7 having a Bragg grating is already known from the publication, "Integrated External Cavity Laser . . . " by T. Tanaka et al., Electronics Letters, volume 32, No. 13, pp. 1202 ff., and thus does not need to be discussed further in detail. The semiconductor laser, preferably a semiconductor laser having broadened field diameters for coupling reasons, in connection with the wavelength-selective Bragg grating, emits in a stable fashion at Bragg wavelength $\lambda_i$. At a reflection coefficient>40% of Bragg grating 11, the transmission source becomes less sensitive with respect to external reflections at transmission wavelength $\lambda_i$. Bragg gratings 11 and 14 can be realized so as to be very temperature-stable, due to the fact that planar strip waveguides 18 have a high boron doping. The gratings themselves are manufactured using irradiation by UV light, either a phase mask being used, or the UV light in an interferometer design being coherently superimposed. One problem in the coupling of laser diode 7 to the planar waveguide is presented by reflections at the separating surface between the semiconductor crystal and the glass strip waveguide.

Figure 3:
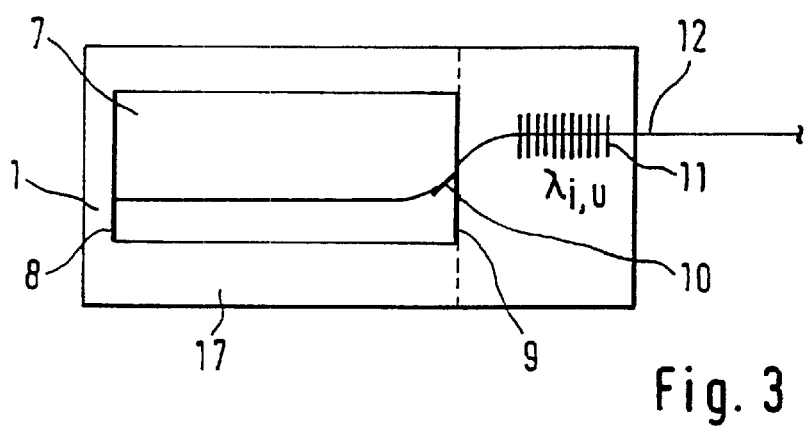
FIG. 3 shows the coupling of a semiconductor laser to a glass strip waveguide having a Bragg grating, in accordance with an example embodiment of the present invention.

FIG. 3 depicts a detailed sketch of a wavelength-stable transmission source. Semiconductor laser diode 7 at the uncoupled end has a highly reflective layer 8, from which no light components, or only a very insignificant quantity, are emitted. The laser diode is designed such that the field is broadened towards the other end. Thus it is possible to couple the laser diode in a passive coupling process to a glass waveguide. In order to achieve a stable emission at wavelength $\lambda_i$, the coupled end surface of laser diode 7 is provided with an antireflective layer 9. The laser resonator is then formed from highly reflective layer 8 and wavelength-selective Bragg grating 11 in the strip waveguide. If the active waveguide in the laser diode is positioned so as to be perpendicular to the antireflective layer, internal reflections in a non-ideal antireflective layer lead to jumps in the emission wavelength (mode jumps). The latter occur particularly in response to temperature changes and to a current modulation of the laser having the data signal. In order to suppress these mode jumps, the active strip waveguide in the laser diode is positioned so as to be diagonal with respect to the end surface having antireflective layer 9. The glass strip waveguide is routed to the laser diode in the same manner. As a result of the fact that both waveguides lead to the separating surface diagonally, the respective reflective optical outputs are not coupled again into the strip waveguides. Since no multiple reflections arise in the laser resonator as a result, mode jumps are suppressed to the greatest possible extent. In accordance with FIG. 2, the emitted optical output passes through the reflective band-pass filter and is coupled into transmission fiber 4. Since the reflective band-pass filter only transmits wavelengths to the output waveguide in a very small range in the vicinity of the emission wavelength, outputs at undesirable wavelengths, not equal to the emission wavelength, are not transmitted to the transmission link, especially in modulation. Wavelengths not equal to $\lambda_i$, running in the reverse direction, do not arrive at the transmission source, since for these wavelengths the reflective band-pass filter is transparent and the unequal wavelengths are quasi absorbed by the diagonal edge at the end. As a result of the use of band-pass filter 14, 15, there is no danger that a different wavelength will pass unimpeded through Bragg grating 11 and reach the semiconductor laser diode. The reflective band-pass filter, for wavelengths not equal to $\lambda_i$, replaces an optical insulator.

Figure 4:
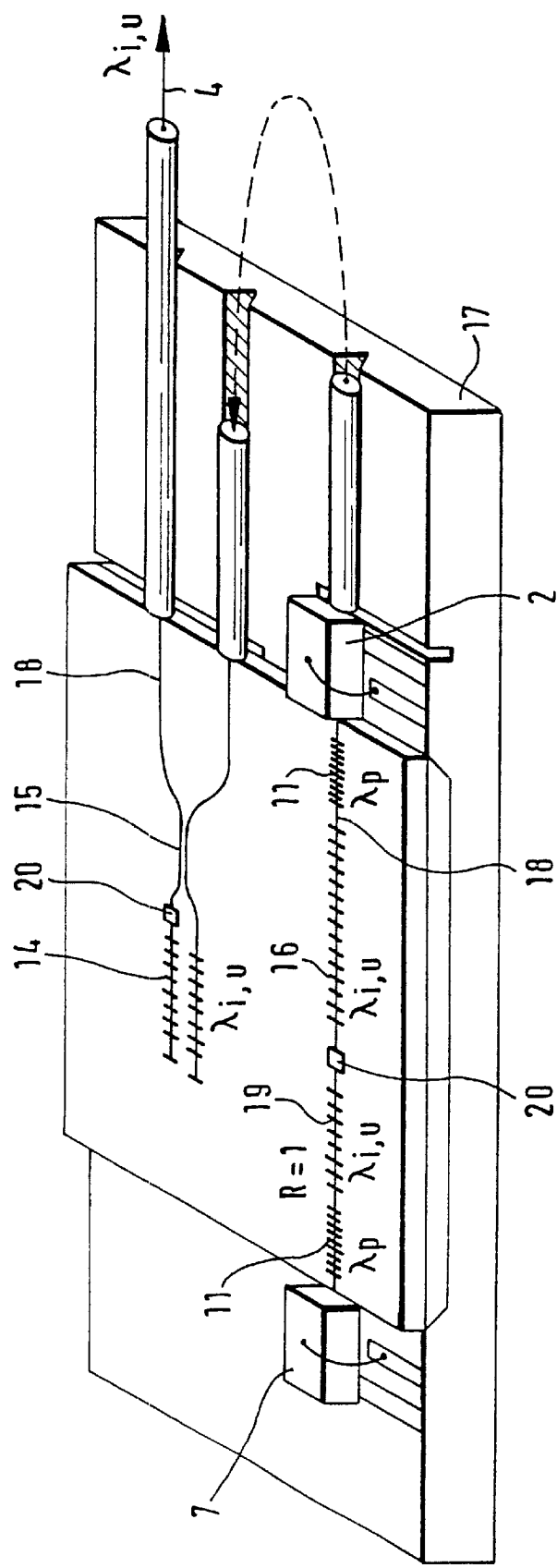
FIG. 4 shows a further example embodiment of the present invention.

FIG. 4 describes a further specific embodiment of the optical transmitter, the laser source having already been described in German Patent 19705669, not previously published. The highly stable laser is formed from an erbium/ytterbium-doped glass waveguide 16. By writing a UV-induced grating into the erbium/ytterbium-doped waveguide area, a DFB laser is realized. This waveguide laser is pumped using a semiconductor laser pump source 7, which in turn is stabilized by a weakly reflective grating 11. Since DFB waveguide laser 16 emits to both sides, a highly reflective grating is written in on the side of the pump laser diode. On the one hand, this leads to the optical output being emitted in the direction of the transmission link, and, on the other hand, no output at wavelength $\lambda_i$ arrives at the pump laser diode. Due to a trimming region 20, it is assured that the reflected output is coupled, in correct phase relation, into DFB waveguide laser 16. A further Bragg grating 11 is connected downstream of waveguide laser 16 to reflect non-absorbed pump output back into the waveguide laser.

What is claimed is:

1. An optical transmitter, comprising:
   a modulation-capable wavelength-stable laser source;
   a Michelson band-pass filter, a signal from the laser source passing through the Michelson band-pass filter; and
   a planar waveguide coupling the signal which passed through the Michelson band-pass filter into an optical fiber of a transmission link.

2. The optical transmitter according to claim 1, wherein the laser source is a semiconductor laser having a matched beam shape and including a Bragg grating.

3. The optical transmitter according to claim 2, wherein an active strip waveguide in the semiconductor laser is routed diagonally to an anti-reflective layer, and the planar waveguide is routed diagonally to a coupling point.

4. The optical transmitter according to claim 1, wherein the laser source includes a waveguide laser which is pumped by a semiconductor laser, an external modulator being connected downstream of the laser source.

5. The optical transmitter according to claim 4, wherein an emission wavelength of the laser source is determined by a Bragg grating.

6. The optical transmitter according to claim 1, wherein the Michelson band-pass filter is also an optical insulator against wavelengths other than an emission wavelength of the laser source.

7. The optical transmitter according to claim 1, wherein open ends of the Michelson band-pass filter terminate in a wave absorber.

8. The optical transmitter according to claim 7, wherein the wave absorber includes a diagonal or a raw edge of the planar waveguide.

* * * * *

UNITED STATES PATENT AND TRADEMARK OFFICE
CERTIFICATE OF CORRECTION

| | |
|---|---|
| PATENT NO. | : 6,591,023 B1 |
| APPLICATION NO. | : 09/509974 |
| DATED | : July 8, 2003 |
| INVENTOR(S) | : Schunk |

It is certified that error appears in the above-identified patent and that said Letters Patent is hereby corrected as shown below:

Column 1, line 10, delete "patent 2,308,461".

Column 1, line 39, change "invention" to --present invention--.

Column 1, lines 43-45, delete "As a result of the measures indicated in the subclaims, an advantageous refinement and improvement of the optical transmitter described in the main claim is possible."

Column 2, line 40, change "the" to --an example--.

Column 3, lines 5-6, change "is already know from the publication" to --is described in--.

Column 3, line 9, change "preferably" to --for example--.

Column 4, line 10, change "Patent 19705669" to --Patent Application No. 197 05 669--.

Column 4, line 10, delete ", not previously published".

UNITED STATES PATENT AND TRADEMARK OFFICE
CERTIFICATE OF CORRECTION

PATENT NO. : 6,591,023 B1
APPLICATION NO. : 09/509974
DATED : July 8, 2003
INVENTOR(S) : Schunk It is certified that error appears in the above-identified patent and that said Letters Patent is hereby corrected as shown below:

Column 4, line 27, insert after "...waveguide laser." the following:

--The transmission output is subsequently coupled into an external modulator. The external modulator is advantageously composed of an electro-absorption modulator, which, on both sides, for passive coupling to the strip waveguide and to the single-mode fiber, has in each case a section for field expansion.

The single-mode fiber in turn is routed to a planar reflective band-pass filter, which conducts the optical output at the transmission wavelength to transmission link 4. Since the reflective band-pass filter only transmits wavelengths to the output waveguide in a very small range in the vicinity of the emission wavelength, wavelengths not equal to $\lambda_i$, running in reverse direction, do not arrive at the transmission source, since for these wavelengths the reflective band-pass filter is transparent and the unequal wavelengths are quasi absorbed at the end by the diagonal edge. By using band-pass filter 14, 15, there is no danger that a different wavelength can pass unhindered through Bragg grating 11 and reach the semiconductor laser diode. The reflective band-pass filter for wavelengths not equal to $\lambda_i$ replaces an optical insulator.--

Signed and Sealed this

Twenty-eighth Day of November, 2006

JON W. DUDAS
*Director of the United States Patent and Trademark Office*